United States Patent
Kopfmann et al.

(10) Patent No.: US 11,452,584 B2
(45) Date of Patent: Sep. 27, 2022

(54) METHOD FOR PRODUCING DENTAL COMPOSITE BLOCKS

(71) Applicant: COLTÈNE/WHALEDENT AG, Altstätten (CH)

(72) Inventors: Cornelia Kopfmann, St. Gallen (CH); Ralf Böhner, Kriessern (CH)

(73) Assignee: COLTÈNE/WHALEDENT AG, Altstätten (CH)

( * ) Notice: Subject to any disclaimer, the term of this patent is extended or adjusted under 35 U.S.C. 154(b) by 271 days.

(21) Appl. No.: 15/755,851

(22) PCT Filed: Sep. 22, 2016

(86) PCT No.: PCT/EP2016/072497
§ 371 (c)(1),
(2) Date: Feb. 27, 2018

(87) PCT Pub. No.: WO2017/055159
PCT Pub. Date: Apr. 6, 2017

(65) Prior Publication Data
US 2018/0325636 A1    Nov. 15, 2018

(30) Foreign Application Priority Data
Sep. 28, 2015 (EP) .................................. 15187121

(51) Int. Cl.
*B29C 35/06* (2006.01)
*A61C 13/00* (2006.01)
(Continued)

(52) U.S. Cl.
CPC .......... *A61C 13/0022* (2013.01); *A61C 13/09* (2013.01); *A61C 13/20* (2013.01);
(Continued)

(58) Field of Classification Search
CPC ...... B29C 35/007; B29C 35/02; B29C 35/025
See application file for complete search history.

(56) References Cited

U.S. PATENT DOCUMENTS

| | | | |
|---|---|---|---|
| 4,682,644 | A | 7/1987 | Ueno |
| 8,067,482 | B2 | 11/2011 | Rheinberger et al. |

(Continued)

FOREIGN PATENT DOCUMENTS

| | | |
|---|---|---|
| CN | 104494105 A | 4/2015 |
| EP | 0 118 079 A1 | 9/1984 |

(Continued)

OTHER PUBLICATIONS

EP 0118079 machine translation (Year: 1984).*
(Continued)

*Primary Examiner* — Timothy Kennedy
*Assistant Examiner* — Alexander A Wang
(74) *Attorney, Agent, or Firm* — Finch & Maloney PLLC; Jay S. Franklin; Michael J. Bujold

(57) ABSTRACT

A hollow-cylindrical device (1) having first and second openings (2, 3) for continuous production of a dental composite block. A curable composite material (4) and a temperature control unit (5) are provided. The composite material (4) is introduced into the device (1) through the first opening. The composite material (4) is cured by energy from the temperature control unit (5). An energy input occurs across a defined length of the substantially hollow-cylindrical device (1) and/or for a defined period of time. The composite material (4) is subsequently guided through the first opening (2) of the device (1). The composite material (4) is discharged from the second opening (3). In a first region along a portion of the length of the device, the device is either provided with an insulation or the flow-through device has a heat conductivity of 0.05 to 12 W/(m×K).

15 Claims, 2 Drawing Sheets

Figure 1:
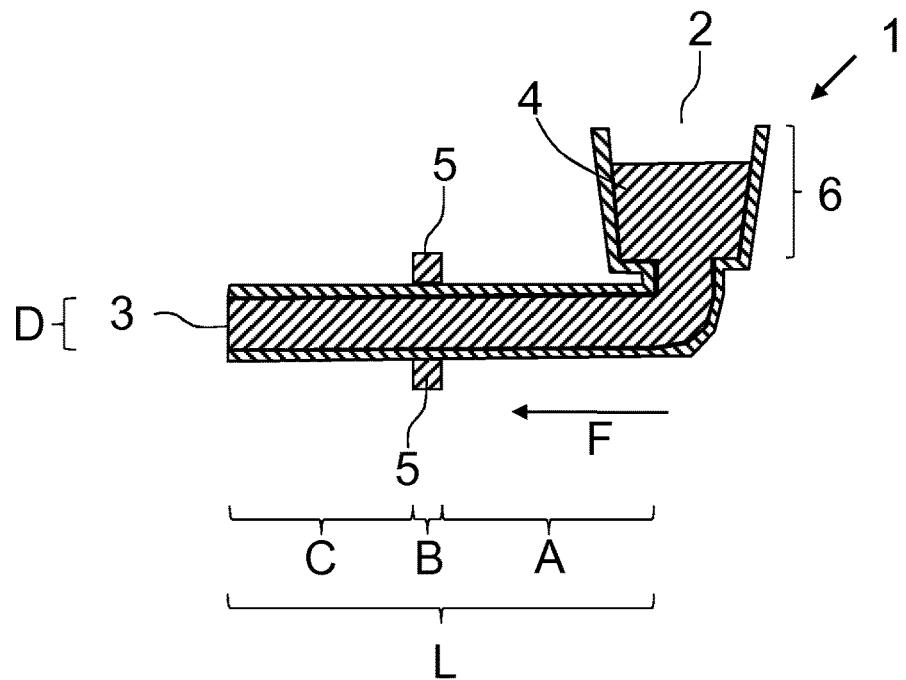

(51) Int. Cl.
    *A61C 13/20*     (2006.01)
    *B29C 35/10*     (2006.01)
    *B29C 39/14*     (2006.01)
    *B29C 39/38*     (2006.01)
    *B29C 33/40*     (2006.01)
    *A61C 13/09*     (2006.01)
    *B29K 33/00*     (2006.01)
    *B29K 105/16*    (2006.01)

(52) U.S. Cl.
    CPC .............. *B29C 33/40* (2013.01); *B29C 35/06* (2013.01); *B29C 35/10* (2013.01); *B29C 39/14* (2013.01); *B29C 39/38* (2013.01); *B29K 2033/08* (2013.01); *B29K 2105/162* (2013.01); *B29K 2995/0015* (2013.01)

(56) References Cited

U.S. PATENT DOCUMENTS

| | | |
|---|---|---|
| 2004/0241614 A1 | 12/2004 | Goldberg et al. |
| 2013/0277873 A1 | 10/2013 | Sadoun |
| 2014/0162216 A1 | 6/2014 | Craig et al. |
| 2014/0248584 A1 | 9/2014 | Wolter et al. |
| 2016/0128812 A1 | 5/2016 | Nakayama et al. |

FOREIGN PATENT DOCUMENTS

| | | |
|---|---|---|
| EP | 2 881 077 A1 | 6/2015 |
| FR | 2 614 490 A1 | 10/1988 |
| GB | 1442041 | 7/1976 |
| WO | 00/40206 A1 | 7/2000 |
| WO | 03/078143 A1 | 9/2003 |
| WO | 2007/099158 A2 | 9/2007 |
| WO | 2013/076493 A1 | 5/2013 |
| WO | 2015/045698 A1 | 4/2015 |
| WO | 2015/092392 A1 | 6/2015 |

OTHER PUBLICATIONS

"Plastics—Thermal Conductivity Coefficients", The Engineering ToolBox, www.EngineeringToolBox.com, Jun. 21, 2016.
European Search Report Corresponding to 15187121.7 dated Apr. 4, 2016.
European Search Report Corresponding to 15187121.7 dated Jun. 30, 2016.
International Search Report Corresponding to PCT/EP2016/072497 dated Dec. 7, 2016.
Written Opinion Corresponding to PCT/EP2016/072497 dated Dec. 7, 2016.
Japanese Office Action dated Nov. 2, 2021.

\* cited by examiner

METHOD FOR PRODUCING DENTAL COMPOSITE BLOCKS

The invention relates to a method and a device for producing dental composite blocks.

Methods for producing dental composite blocks are well known. In such methods, dental composite materials are introduced into a mold and cured. Polymerizable components, for example a composite material, are generally cured inter alia by means of an initiator.

WO 2007/099158 A2 describes a material comprising a polymerizable component and an initiator, which is in phlegmatized form. The material is pressed or further pressed into a cuvette, the material inside the cuvette is heated, and the phlegmatized initiator is thus released. A heat-induced polymerization of the material accordingly takes place. A disadvantage of this method is that active further pressing of the material in the cuvette is necessary in order to avoid polymerization shrinkage. This is comparatively complex and difficult to control.

Accordingly, the object of the invention is to overcome the disadvantages of the prior art. In particular, it is an object of the invention to provide a method for producing dental composite blocks which can be controlled particularly well, can be carried out quickly and ensures increased quality of the composite blocks. These objects are achieved by the features of the independent claims.

The invention relates to a method for producing dental composite blocks. An in particular substantially hollow-cylindrical device having a first and a second opening is provided for the continuous production of a dental composite block, in particular a container open on two sides. A curable composite material and a temperature control unit are further provided. The curable composite material is introduced, in particular continuously introduced, into the device through the first opening. The in particular continuously introduced composite material is cured by an energy input by means of the temperature control unit. The energy input is thereby maintained until a substantially dimensionally stable composite block has been produced. The energy input can thereby take place over a length of from 1 cm to 300 cm, preferably from 1.5 to 200 cm, particularly preferably from 5 to 60 cm, of the substantially hollow-cylindrical device (1) and/or for a period of from 1 minute to 200 minutes, preferably from 5 to 60 minutes, particularly preferably from 15 to 45 minutes. Curable composite material is further supplied, in particular continuously further supplied, through the first opening of the substantially hollow-cylindrical device. The composite material thus moves relative to the device. Likewise, the curable composite material can be compressed. The cured composite material is discharged from the second opening of the device. A method is thus provided which can be controlled particularly well and ensures rapid manufacturing times. In particular, improved composite blocks having improved properties are thus provided. In particular, fewer defects occur within the dental composite blocks.

The further supply, in particular continuous further supply, of curable composite material takes place at a maximum of 10 bar. The in particular substantially hollow-cylindrical device can be of any shape, for example with curved edges or trapezoidal. Since the hollow-cylindrical devices typically produced by injection molding generally deviate from exactly hollow-cylindrical shapes, a substantially hollow-cylindrical device is understood here and in the following as meaning that the above-mentioned expression is also to be understood as including geometrical deviations from exact hollow-cylindrical shapes.

The cured and discharged composite material can subsequently be processed, in particular trimmed. In this manner, the discharged composite material can be trimmed to sizes which can subsequently be used for the production of dental restorations of any size.

A mount for the further processing of the composite material to a dental restoration can further be applied to the cured composite material. Any mounts used in the dental field can be applied. In this manner, the cured composite material for further processing can be used, for example, in commercial CAD/CAM processes. The cured composite material for the production of dental restorations can thus be used on all commercial platforms.

The substantially hollow-cylindrical device can have a width in the range of from 0.5 to 5 cm, in particular from 1 to 3 cm. The base area of the substantially hollow-cylindrical device can be in the range of from 0.25 to 25 cm$^2$, in particular from 1 to 9 cm$^2$. In this manner, dental restorations of very different sizes can be produced from the cured material.

The composite material can comprise suitable polymerizable mono- or multi-functional monomers of the organic phase. Suitable polymerizable mono- or multi-functional monomers of the organic phase are preferably mono(meth)acrylates, such as methyl, ethyl, butyl, benzyl, furfuryl or phenyl (meth)acrylate, poly-functional acrylates and methacrylates such as, for example, bisphenol (A) di(meth)acrylate, bisphenol A glycidyl methacrylate (known as "bis GMA", which is an addition product of methacrylic acid and bisphenol A diglycidyl ether), UDMA (an addition product of 2-hydroxyethyl methacrylate and 2,2,4-hexamethylene diisocyanate), di-, tri- and tetra-ethylene glycol di(meth)acrylate (such as, for example, TEGDMA), decanediol di(meth)acrylate, trimethylolpropane tri(meth)acrylate, pentaerythritol tetra(meth)acrylate and butanediol di(meth)acrylate, 1,10-decanediol di(meth)acrylate or 1,12-dodecanediol di(meth)acrylate. Organic phases comprising methacrylate-modified polysiloxanes can also be used.

In principle, the use of monomers that lead to a high network density and flowing generated by pressure can result in defects in layers which have already started to polymerize. Since the composite material preferably comprises difunctional monomers, the polymerization results in a high network density, so that the risk of the formation of defects is very high. In the method described hereinabove for the continuous production of a dental composite block, composite blocks with fewer defects can be produced despite a high resulting network density.

The composite material can comprise >40% by weight of a filler, in the sense of a filling material or a mixture of filling materials. There is provided in particular a relative composition, which is a single component or compositions of single components. The filler or fillers can be present singly, in the sense of isolated fillers, or in agglomerated form or as clusters. Agglomerates are generally understood as being more or less consolidated accumulations of previously loose constituents to form a solid compound. In process technology, agglomerates are obtained, for example, by granulation, flocculation or sintering. The clusters can be mechanically or chemically bonded. The above-mentioned >40% by weight of the filler can include from 0 to 100% by weight dental glass having an average particle size of from 0.1 to 5 µm (for example obtainable from Schott), from 0 to 100% by weight slivers of organic matrix and an organic filler having an average particle size of from 1 to 30 µm. The slivers thereby correspond to a ground composite material. The composition further comprises from 0 to 100% by weight of inorganic fillers produced by the sol-gel process and having an average particle size of from 0.1 to 5 µm and from 0 to 100% by weight of an in particular pyrogenic silica having an average particle size of from 0.002 to 0.25 µm. In this manner, a composite material composition for the method is provided which meets the requirements of the dental field, for example in respect of abrasivity, compression hardness and durability.

The temperature control unit can exert a suitable energy input, which can be adapted to the given conditions by the person skilled in the art in routine tests, on the wall of the substantially hollow-cylindrical device. A defined energy input to the hollow-cylindrical device is thus ensured and the introduced composite material cures. By adjusting or controlling the energy input, the energy required for the curing can be adapted in dependence on the composite material used.

For the material of the device there is preferably used a substance having a thermal conductivity of from 0.05 to 12 W/(m×K). Preference is given to the use of plastics materials, which can be unfilled, filled or foamed. In particular, it is a plastics material having a thermal conductivity of from 0.14 to 1.2 W/(m×K). However, other materials, for example metals, which have a higher thermal conductivity can also be used. In this case, the conduction of heat can be prevented by an interruption, for example an insulator or an insulating layer having a thermal conductivity of from 0.05 to 12 W/(m×K). The insulator is thereby arranged close to the region of the energy input by means of the temperature control unit. In this manner it is ensured that the heat energy does not spread to the whole of the device, and undesired polymerization of introduced composite material outside the polymerization region is thus prevented.

A further aspect of the invention relates to a method for producing dental composite blocks, comprising the following steps. Providing an in particular substantially hollow-cylindrical mold, in particular a container, providing a curable composite material, and providing a focusable heat source. The curable composite material is introduced into the substantially hollow-cylindrical mold, in particular into the container. The introduced, curable composite material in the mold can be compacted in particular by means of gravitation, sedimentation or compression. The introduced, curable composite material is cured by means of an in particular successive heat transfer to the substantially hollow-cylindrical mold, whereby the composite material remains constantly in the mold or does not move relative to the mold. This is achieved, for example, by immersing a container, for example a cuvette, filled with curable composite material in a heating bath, and the heat front thus moves along the container. The wall of the substantially hollow-cylindrical mold, in particular of the container, is thereby in such a form that it has a thermal conductivity in the range of from 0.05 to 12 W/(m×K), in particular from 0.14 to 1.2 W/(m×K). In this manner, a method is provided in which an introduced composite material can be cured in a particularly advantageous manner. There is thus provided in particular a cured composite material for a homogeneous workpiece without porosities and air inclusions. The cured composite material is thus produced without stress and accordingly with fewer defects. Airless compaction in particular can be carried out, for example, by the removal of air, for example by means of a vacuum and/or centrifugation.

"Successive heat transfer" is understood here and in the following as meaning that the heat input first takes place for a specific period of time in a region of the substantially hollow-cylindrical mold. The heat input then takes place for a specific period of time in a second region of the substantially hollow-cylindrical mold which in particular is adjacent to the first region. Such a successive heat transfer can take place in at least two or more regions of the substantially hollow-cylindrical mold, so that curable composite material inside the substantially hollow-cylindrical mold is cured in a plurality of regions successively, in the sense of layer by layer.

A "focusable heat source" is understood here and in the following as meaning that the heat input of the heat source is locally focusable on an object, here the substantially hollow-cylindrical mold. That is to say, the heat input can be focused by the heat source on a part-region of the substantially hollow-cylindrical mold. The main heat input accordingly takes place in the region of the object that is locally focused by the heat source. The composite material inside the substantially hollow-cylindrical mold is thus not cured as a whole at the same time, as is the case in an oven, for example, but the composite material is cured region by region and thus layer by layer.

The composite materials described hereinabove can be used similarly.

Furthermore, a mount for the further processing of the composite material to a dental restoration can be applied to the cured composite material. The cured composite material can thus be fed to common platforms for further processing to dental restorations.

The heat source can exert an energy input on the wall of the substantially hollow-cylindrical mold until a substantially dimensionally stable composite block has been produced. A defined energy input to the substantially hollow-cylindrical mold is thus ensured, and the introduced composite material cures. By adjusting or controlling the energy input, the energy required for the curing can be adapted in dependence on the composite material used. The energy input can be adapted to the given conditions by a person skilled in the art in routine tests.

The substantially hollow-cylindrical mold, in particular the container, can be in such a form that it has substantially the dimensions of a dental composite block. The width can be in the range of from 0.5 to 5 cm, in particular from 1 to 3 cm. The base area of the substantially hollow-cylindrical mold can be in the range of from 0.25 to 25 cm$^2$, in particular from 1 to 9 cm$^2$. Dimensions of 12 cm×3 cm, in particular 10 cm×2.5 cm, can likewise be provided. In this manner, dental restorations of very different sizes can be produced from the cured material.

Here and in the following, the substantially hollow-cylindrical mold, in particular the container, can preferably be a cuvette.

The composite material can comprise >40% by weight of a filler, in the sense of a filling material. The composite material and the filler can be composed as explained hereinabove.

The heat source and/or the substantially hollow-cylindrical mold, in particular the container, can be arranged to be vertically adjustable. Both the above-mentioned elements can in particular be arranged to be vertically adjustable relative to one another. This is to be understood as meaning that either the heat source is arranged to be movable relative to the substantially hollow-cylindrical mold, the substantially hollow-cylindrical mold is arranged to be vertically adjustable relative to the heat source, or both the heat source and the substantially hollow-cylindrical mold are arranged to be vertically adjustable relative to one another. In this manner, the relative positions of the above-mentioned two elements can be adapted in dependence on one another, and a successive energy input to the mold can thus be made possible in a particularly optimum manner. The method can in particular thus be controlled particularly advantageously. If the mold and the heat source are moved relative to one another, the speed of the movement can be used to control the heat input to the mold and thus the curing of the composite material.

A further aspect of the invention relates to the use of a dental composite block, produced by one of the above-mentioned methods for producing dental replacement parts. There are thus produced from the cured composite material dental replacement parts which have particularly advantageous properties, for example abrasivity, compression hardness and durability.

The invention relates further to a dental composite block which has been produced or can be produced by one of the above-mentioned methods.

A further aspect of the invention relates to a flow-through device which is substantially hollow-cylindrical in shape, in particular a container open on two sides, for the production of a dental composite block. The device either has an insulation in a first region along a portion of the length of the device, or the material of the first region of the device has a thermal conductivity of from 0.05 to 12 W/(m×K). Optionally, the device has a further insulation in a second region, or the material of the second region has a thermal conductivity of from 0.05 to 12 W/(m×K). There is a space between the first and the second region along the length. The insulators are in such a form and are so arranged that, when there is a heat input in a region of the mold, the heat is concentrated in particular in the above-mentioned region of the mold. In this manner, an energy input in regions that are further away is prevented, and undesired polymerization of introduced composite material before the region of the heat input is excluded. A defined or concentrated region for curing of the composite material is thus provided. A single insulator can be arranged upstream of the region of the heat input, so that incoming material does not begin to cure prematurely. Likewise, two insulators can be arranged, so that the region of the heat input is enclosed by the two insulators, whereby the heat front is again defined. Accordingly, the above-mentioned device including insulators can be used in one of the above-mentioned production methods, which proceed in particular continuously. Continuously is understood hereinabove, here and in the following as meaning that curable composite material is continuously introduced into a first opening of a device, and that introduced material is cured and discharged from a second opening.

The invention is explained in greater detail in the following by means of figures of exemplary embodiments.

Figure 2:
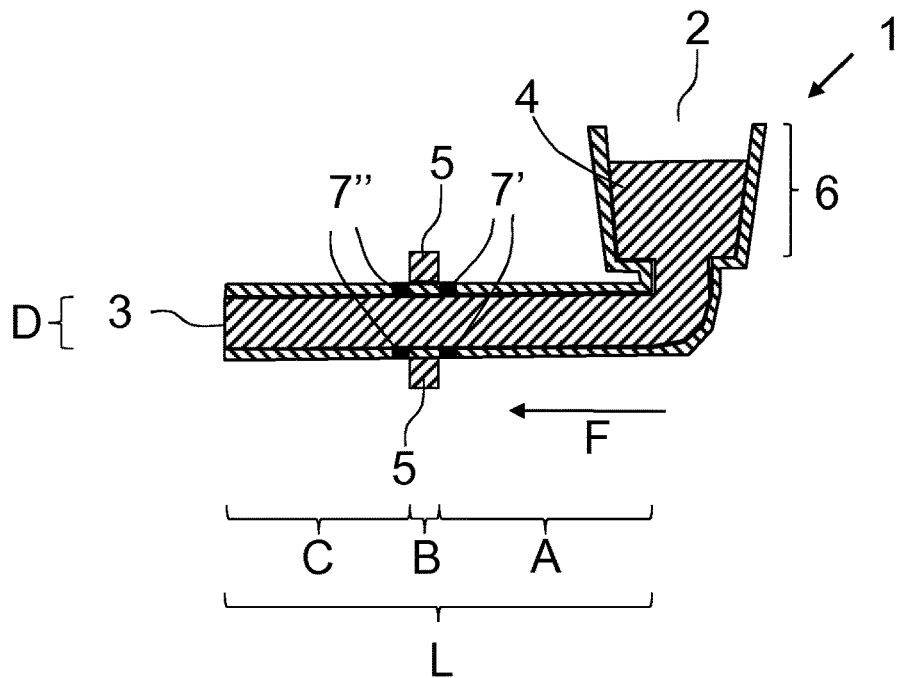
Figure 3:
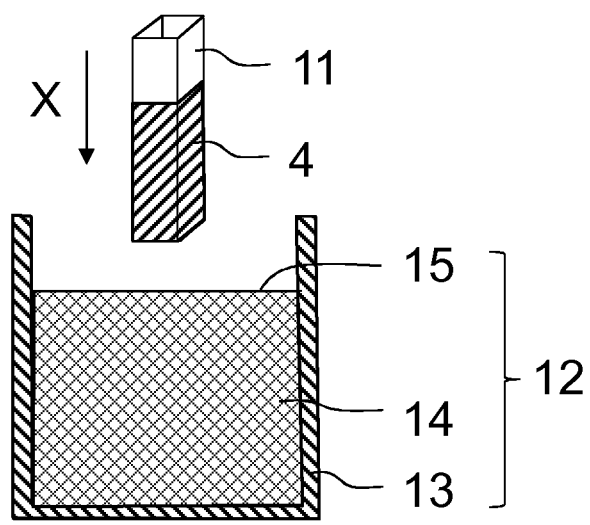

In the figures:

FIG. 1: shows a first embodiment of a device for carrying out the method according to the invention for producing dental composite blocks;

FIG. 2: shows a second embodiment of a device for carrying out the method according to the invention for producing dental composite blocks;

FIG. 3: shows the arrangement of a third embodiment of a device for carrying out the method according to the invention for producing dental composite blocks.

The composite materials used within the scope of an exemplary embodiment are to be found by way of example in the following table.

| | |
|---|---|
| Resin (methacrylate/nanofiller) | 33.5% by weight |
| Barium glass, 0.7 and 1.2 μm (1:1; Schott) | 64.0% by weight |
| Peroxide initiator | 2.0% by weight |
| Dyes/stabilizers | 3.5% by weight |

FIG. 1 shows a device 1 comprising a hollow-cylindrical region of length L and a reservoir 6. Curable composite material 4 is introduced into the reservoir 6 of the device 1 through a first opening 2. The reservoir 6 is in contact with the hollow-cylindrical region of the device 1, so that the curable composite material 4 flows into the hollow-cylindrical region. The flow or further flow of curable composite material takes place in the direction of flow F. The device 1 further comprises a temperature control unit 5 which exerts an energy input on the curable composite material via the wall of the device. Incoming composite material is thus cured in the region of the temperature control unit 5. As a result of the further flow of the curable composite material in region A of the device 1, composite material cured in region B of the device is discharged through region C and the second opening 3 of the device 1. In this manner, cured composite material is continuously produced from curable composite material, which cured composite material, after leaving the second opening 3 of the device 1, can be trimmed to dental composite blocks. The device 1 can be configured with advantageous widths D and lengths L.

FIG. 2 shows all the features which have already been described hereinabove for FIG. 1. FIG. 2 further shows two insulators 7', 7", which flank the temperature control unit 5. The first insulator 7' is arranged upstream of the temperature control unit 5 in the direction of flow F and the second insulator 7" is arranged downstream of the temperature control unit 5 in the direction of flow F. The energy input to the wall of the device 1 by the temperature control unit 5 is thereby prevented by the two insulators 7', 7" from spreading to other regions of the device. Accordingly, the energy input takes place only in region B of the device, so that curing, polymerization of the curable composite material takes place only in that region B. The start of polymerization in region A can thus be excluded. In this manner, the attachable composite material is cured purposively and in a controlled manner in region B.

FIG. 3 shows an arrangement of a cuvette 11 and a heat source 12 in the form of a heating bath 13 having a heating liquid 14 and a surface 15 of the heating liquid 14. The cuvette 11 is filled with curable composite material 4. The filled cuvette 11 is brought closer to the surface 15 of the heating liquid 14 in a controlled manner in the direction of movement X and is immersed therein. By continuous further guiding of the filled cuvette, a defined heat front is applied to the curable composite material 4 by immersion in the heating liquid. Polymerization of the composite material accordingly takes place in the region of the heat front and thus layer by layer along the direction of movement X. The wall of the cuvette has a thermal conductivity in the range of from 0.05 to 12 W/(m×K), in particular from 0.14 to 1.2 W/(m×K). The chosen thermal conductivity ensures a defined heat front for curing the composite material inside the cuvette. Accordingly, a dental composite material for the production of dental composite blocks is provided, which material has few defects.

The invention claimed is:

1. A method for producing dental composite blocks, comprising:

providing a hollow-cylindrical device having first and second openings for continuous production of a dental composite block, providing a curable composite material, providing a temperature control unit, introducing the curable composite material into the hollow-cylindrical device through the first opening, curing the composite material by an energy input by means of the temperature control unit, supplying further curable composite material through the first opening of the hollow-cylindrical device at a maximum pressure of 10 bar and a maximum velocity of supply of 5 mm/s, and discharging the cured composite material from the second opening of the device.

2. The method as claimed in claim 1, wherein a mount for further processing of the composite material to a dental restoration is applied to the cured composite material.

3. The method as claimed in claim 1, wherein the hollow-cylindrical device is in such a form that the hollow-cylindrical device has dimensions of a dental composite block.

4. The method as claimed in claim 1, wherein the composite material comprises >40% by weight filler.

5. The method as claimed in claim 1, wherein at least one of the temperature control unit and the hollow-cylindrical device is arranged to be vertically adjustable.

6. The method as claimed in claim 1 wherein the method comprises compaction of the introduced curable composite material in the hollow-cylindrical device before curing of the introduced curable composite material.

7. The method as claimed in claim 1 wherein the curable composite material comprises difunctional monomers for forming a high network density of the cured composite material.

8. The method of claim 1, wherein a thermal conductivity of a wall of the hollow-cylindrical device is from 0.14 to 1.2 W/(m×K).

9. The method of claim 1, further comprising:

providing a first insulator upstream of the curing region; and providing a second insulator downstream of the curing region, wherein the first insulator is spaced from the second insulator by the curing region such that polymerization of the curable composite material only takes place in the curing region.

10. The method of claim 9, wherein the curing region includes two or more adjacent regions.

11. The method of claim 9 wherein supplying the curable composite material is performed continuously.

12. A method for producing dental composite blocks, comprising:

providing a hollow-cylindrical device having first and second openings for continuous production of a dental composite block;

providing a curable composite material;

providing a temperature control unit and a focusable heat source;

introducing the curable composite material into the hollow-cylindrical device through the first opening;

curing the composite material by focusing the heat source on a first region of the hollow-cylindrical device for a first length of time and focusing the heat source on a second region, adjacent the first region for a second length of time, such that the curing is performed successively layer-by-layer;

further supplying curable composite material through the first opening of the hollow-cylindrical device at a maximum pressure of 10 bar and a maximum velocity of supply of 5 mm/s; and discharging the cured composite material from the second opening of the device.

13. The method of claim 12, wherein a thermal conductivity of a wall of the hollow-cylindrical device is from 0.05 to 12 W/(m×K).

14. The method of claim 13, wherein the hollow-cylindrical device is made of a polymer material having a thermal conductivity from 0.14 to 1.2 W/(m×K).

15. The method of claim 12, wherein the first region is immediately adjacent the second region.

\* \* \* \* \*